(12) United States Patent
Shi

(10) Patent No.: US 11,051,301 B2
(45) Date of Patent: Jun. 29, 2021

(54) METHOD FOR DETERMINING RESOURCE LOCATION, TERMINAL DEVICE, AND NON-TRANSITORY COMPUTER READABLE STORAGE MEDIUM

(71) Applicant: GUANGDONG OPPO MOBILE TELECOMMUNICATIONS CORP., LTD., Guangdong (CN)

(72) Inventor: Zhihua Shi, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/992,888

(22) Filed: Aug. 13, 2020

(65) Prior Publication Data

US 2020/0374877 A1    Nov. 26, 2020

Related U.S. Application Data

(63) Continuation of application No. PCT/CN2018/085907, filed on May 7, 2018.

(51) Int. Cl.
| | | |
|---|---|---|
| H04W 72/04 | (2009.01) | |
| H04W 72/08 | (2009.01) | |
| H04W 24/10 | (2009.01) | |

(52) U.S. Cl.
CPC ....... H04W 72/0446 (2013.01); H04W 24/10 (2013.01); H04W 72/085 (2013.01)

(58) Field of Classification Search
None
See application file for complete search history.

(56) References Cited

U.S. PATENT DOCUMENTS

| | | | |
|---|---|---|---|
| 8,948,142 B2 | 2/2015 | Xing | |
| 9,509,461 B2 | 11/2016 | Kim et al. | |
| 9,509,475 B2 * | 11/2016 | Kim | H04J 11/0093 |

(Continued)

FOREIGN PATENT DOCUMENTS

| | | |
|---|---|---|
| CN | 101730232 A | 6/2010 |
| CN | 101998653 A | 3/2011 |

(Continued)

OTHER PUBLICATIONS

3rd Generation Partnership Project; Technical Specification Group Radio Access Network; NR; Physical layer procedures for data (Release 15); 3GPP TS 38.214 V15.3.0 (Sep. 2018).

(Continued)

*Primary Examiner* — Gennadiy Tsvey
(74) *Attorney, Agent, or Firm* — Perkins Coie LLP

(57) ABSTRACT

Embodiments of the application provide a method for determining a resource location in a terminal device, a terminal device, and a non-transitory computer readable storage medium. A terminal device determines a second downlink slot corresponding to the CSI reporting moment based on a first uplink slot where channel state information (CSI) reporting moment is located; the terminal device obtains a slot offset, where the slot offset is a slot offset of a location of a CSI reference resource on a time domain relative to the second uplink slot; the terminal device determines the location of the CSI reference resource on the time domain based on the second uplink slot and the slot offset.

17 Claims, 1 Drawing Sheet

---

101

Determine a slot offset based on downlink measurement resource configuration and uplink reporting resource configuration that are included in CSI reporting configuration information, where the slot offset represents a slot offset of a CSI reference resource relative to a reporting moment

102

Determine a location of the CSI reference resource on a time domain based on at least the slot offset

(56) References Cited

U.S. PATENT DOCUMENTS

| | | | |
|---|---|---|---|
| 9,800,386 B2* | 10/2017 | Kang | H04B 7/0626 |
| 2011/0230223 A1 | 9/2011 | Lu | |
| 2012/0039279 A1* | 2/2012 | Chen | H04W 72/1284 370/329 |
| 2012/0106521 A1 | 5/2012 | Xing | |
| 2013/0182789 A1* | 7/2013 | Ko | H04B 7/0626 375/267 |
| 2013/0286933 A1* | 10/2013 | Lee | H04L 5/001 370/315 |
| 2014/0105055 A1* | 4/2014 | Kang | H04W 24/10 370/252 |
| 2014/0301324 A1* | 10/2014 | Cheng | H04L 5/0055 370/329 |
| 2014/0362792 A1* | 12/2014 | Cheng | H04W 72/0413 370/329 |
| 2015/0023275 A1 | 1/2015 | Kim et al. | |
| 2015/0146634 A1* | 5/2015 | Hwang | H04L 1/0026 370/329 |
| 2015/0195070 A1* | 7/2015 | Kim | H04J 11/0093 370/329 |
| 2015/0244444 A1* | 8/2015 | Mazzarese | H04B 7/0626 370/252 |
| 2015/0282165 A1 | 10/2015 | Ni et al. | |
| 2016/0294454 A1* | 10/2016 | Onggosanusi | H04B 7/0456 |
| 2016/0359538 A1* | 12/2016 | Onggosanusi | H04L 5/0057 |
| 2017/0041120 A1* | 2/2017 | Wei | H04L 1/0027 |
| 2018/0042012 A1* | 2/2018 | Yerramalli | H04W 72/042 |
| 2018/0167935 A1* | 6/2018 | Yan | H04L 5/0094 |
| 2018/0227030 A1 | 8/2018 | Chen et al. | |
| 2019/0312622 A1* | 10/2019 | Fu | H04L 1/0027 |

FOREIGN PATENT DOCUMENTS

| | | | | |
|---|---|---|---|---|
| CN | 105471546 A | 4/2016 | | |
| CN | 106411377 A | 2/2017 | | |
| EP | 2903361 A1 * | 8/2015 | | H04L 1/0057 |
| WO | 2013125841 A1 | 8/2013 | | |

OTHER PUBLICATIONS

MediaTek Inc. "Remaining issues in CSI measurement", 3GPP TSG RAN WG1 Meeting #93, R1-1806786, Busan, Korea, May 21-25, 2018.

OPPO. "Remaining issues on CSI reporting", 3GPP TSG RAN WG1 Meeting #93, R1-1806848, Susan, Korea, May 21-May 25, 2018.

International Search Report in the international application No. PCT/CN2018/085907, dated Feb. 2, 2019.

NTT Docomo et al: "Views on CSI feedback for shortened TTI with reduced processing time" 3GPP Draft; R1-1612699, 3RD Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 5, 2016 (Nov. 5, 2016), XP051190525, Retrieved from the Internet: URL: http://www.3gpp.org/ftp/tsg_ran/WG1 Rl1/TSGRI 87/Docs/ retrieved on Nov. 5, 2016]* p. 2.

Supplementary European Search Report in the European application No. 18917792.6, dated Feb. 22, 2021.

* cited by examiner

METHOD FOR DETERMINING RESOURCE LOCATION, TERMINAL DEVICE, AND NON-TRANSITORY COMPUTER READABLE STORAGE MEDIUM

CROSS-REFERENCE TO RELATED APPLICATION

This application is a U.S. continuation application of International Application No. PCT/CN 2018/085907, entitled "METHOD FOR DETERMINING RESOURCE LOCATION, TERMINAL APPARATUS, AND NETWORK APPARATUS", filed on May 7, 2018, the disclosure of which is hereby incorporated by reference in its entirety.

BACKGROUND

Different numerologies are introduced into NR. For different numerologies, subcarrier spacings on a frequency domain are different, and time lengths of all slots on a time domain are also different. When different numerologies are used for an uplink and a downlink, counts of slots of the uplink and the downlink are different. For channel state information (CSI) reporting, reference needs to be made based on a CSI reference resource, and a location of the CSI reference resource depends on both a reporting moment and nCQI_ref (that is, a slot offset of the CSI reference resource relative to the reporting moment).

SUMMARY

The present disclosure relates to the field of information processing technologies, and in particular, to a method for determining a resource location, a terminal device, and a non-transitory computer readable storage medium.

A first aspect of the present disclosure provides a method for determining a resource location. The method is implemented by a terminal device, and includes:
determining, based on a first uplink slot where channel state information (CSI) reporting moment is located, a second downlink slot corresponding to the CSI reporting moment;
obtaining a slot offset, where the slot offset is a slot offset of a location of a CSI reference resource on a time domain relative to the second uplink slot;
determining, based on the second uplink slot and the slot offset, the location of the CSI reference resource on the time domain.

A second aspect of the present disclosure provides a terminal device in a communication system. The terminal device includes:
a processor;
a memory storing program instructions,
when the program instructions are executed by the processor, the terminal device is configured to:
determine, based on a first uplink slot where channel state information (CSI) reporting moment is located, a second downlink slot corresponding to the CSI reporting moment;
obtain a slot offset, where the slot offset is a slot offset of a location of a CSI reference resource on a time domain relative to the second uplink slot;
determine, based on the second uplink slot and the slot offset, the location of the CSI reference resource on the time domain.

A third aspect of the present disclosure provides a non-transitory computer readable storage medium, storing computer readable instructions, which when executed by a processor, cause the processor to perform operations comprising:
determining, based on a first uplink slot where channel state information (CSI) reporting moment is located, a second downlink slot corresponding to the CSI reporting moment;
obtaining a slot offset, where the slot offset is a slot offset of a location of a CSI reference resource on a time domain relative to the second uplink slot;
determining, based on the second uplink slot and the slot offset, the location of the CSI reference resource on the time domain.

DETAILED DESCRIPTION

To make the features and technical content of the embodiments of the present invention more comprehensible, the following describes implementations of the embodiments of the present invention in detail with reference to the accompanying drawings. The accompanying drawings are intended only for reference, and not intended to limit the embodiments of the present invention.

Currently, in standards, merely values of nCQI_ref under different numerologies are provided, and whether the numerology is determined based on a numerology of uplink reporting or a numerology of downlink measurement is not provided. In addition, when different numerologies are used for an uplink and a downlink, a plurality of downlink subframes may be obtained according to a reporting moment and nCQI_ref. How to determine which downlink subframe is the CSI reference resource is also a problem to be resolved.

Embodiment 1

Figure 1:
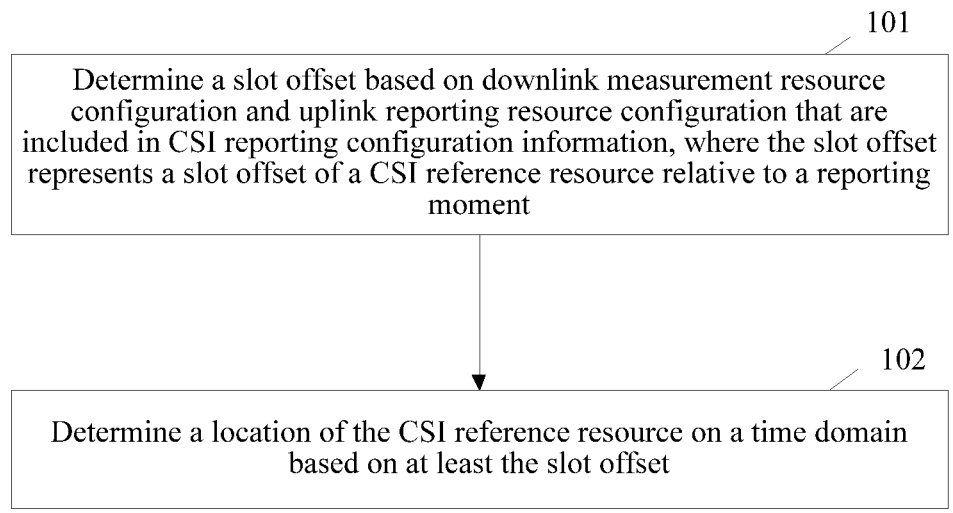
FIG. 1 is a schematic flowchart of a method for determining a resource location according to an embodiment of the present invention.

This embodiment of the present invention provides a method for determining a resource location, where the method is applied to a terminal device and as shown in FIG. 1, includes:
Step 101: Determine a slot offset based on downlink measurement resource configuration and uplink reporting resource configuration that are included in CSI reporting configuration information, where the slot offset represents a slot offset of a CSI reference resource relative to a reporting moment.
Step 102: Determine a location of the CSI reference resource on a time domain based on at least the slot offset.
Before step 101 is performed, the method further includes:
receiving first information sent by a network side; and
obtaining at least one piece of CSI reporting configuration information based on the first information.
Specifically, the CSI reporting configuration information further includes: CSI reporting being at least one of the following: periodic reporting, quasi-periodic reporting, and aperiodic reporting.

The downlink measurement resource configuration included in the CSI reporting configuration information includes: configuration of a measurement resource corresponding to CSI reporting.

The uplink reporting resource configuration included in the CSI reporting configuration information includes: PUCCH resource configuration during reporting and/or PUSCH resource configuration during reporting.

It should be noted that the PUCCH resource configuration may be a subcarrier spacing when reporting is performed by using a PUCCH; and the PUSCH resource configuration may be a subcarrier spacing when reporting is performed by using a PUSCH. Certainly, the PUCCH or PUSCH resource configuration may further include other parameters, but the parameters are not further exhaustively listed in this embodiment.

In the foregoing step 101, the determining a slot offset based on downlink measurement resource configuration and uplink reporting resource configuration that are included in CSI reporting configuration information may include the following several specific processing manners.

Manner 1: When CSI reporting is periodic reporting or quasi-periodic reporting, the slot offset of the CSI reference resource relative to the reporting moment is determined based on resource configuration during PUCCH or PUSCH reporting.

Specifically, during periodic reporting or quasi-periodic reporting, a value of nCQI_ref (the slot offset of the CSI reference resource relative to the reporting moment) is obtained through table lookup by using a subcarrier spacing in the resource configuration during PUCCH or PUSCH reporting.

A table corresponding to the table lookup operation may be a first table corresponding to a preset subcarrier spacing and a preset slot offset.

It should be noted that, for the manner of determining, based on resource configuration during PUCCH or PUSCH reporting, the slot offset of the CSI reference resource relative to the reporting moment, apart from the table lookup described above, there may further be other processing methods. For example, the slot offset may be determined by using a preset correspondence. For example, it is preset that a subcarrier spacing 1 corresponding to the PUCCH or the PUSCH corresponds to a slot offset 1, and a subcarrier spacing 2 corresponds to a slot offset 2. In addition, calculation may alternatively be performed based on a preset calculation formula. For example, a calculation formula is specified according to a correspondence between a subcarrier spacing and a slot offset, and the slot offset may be obtained by performing calculation on different subcarrier spacings and corresponding parameters, where the specified calculation formula may be specified according to an actual case.

Manner 2: When CSI reporting is periodic reporting or quasi-periodic reporting, the slot offset of the CSI reference resource relative to the reporting moment is determined based on resource configuration of a downlink measurement resource corresponding to the CSI reporting configuration information.

Specifically, during periodic reporting or quasi-periodic reporting, a value of nCQI_ref is obtained through table lookup by using a subcarrier spacing of the downlink measurement resource corresponding to the CSI reporting.

In other words, in this manner, the resource configuration of the downlink measurement resource may further include: the subcarrier spacing.

Likewise, a processing manner for table lookup in this manner may also be replaced. Specific replacement processing is the same as that in Manner 1, and details are not described herein again.

Manner 3: When CSI reporting is periodic reporting or quasi-periodic reporting, the slot offset of the CSI reference resource relative to the reporting moment is determined based on resource configuration during PUCCH or PUSCH reporting and resource configuration during downlink measurement corresponding to the CSI reporting configuration information.

Specifically, when CSI reporting is periodic reporting or quasi-periodic reporting, the slot offset of the CSI reference resource relative to the reporting moment is obtained based on a smallest or largest subcarrier spacing in the resource configuration during PUCCH or PUSCH reporting and resource configuration during downlink measurement corresponding to the CSI reporting configuration information.

For example, a value of nCQI_ref may be obtained through table lookup by using the smallest or largest subcarrier spacing of the downlink measurement resource corresponding to the CSI reporting during PUCCH or PUSCH reporting. Likewise, a processing manner for table lookup in this manner may also be replaced. Specific replacement processing is the same as that in Manner 1, and details are not described herein again.

Manner 4: When CSI reporting is aperiodic reporting, the slot offset of the CSI reference resource relative to the reporting moment is obtained according to a CSI calculation time.

For example, if reporting is performed by using a PUSCH (or a PUCCH), when aperiodic CSI is reported by using the PUSCH, a value of nCQI_ref is obtained by using Z' (that is, a calculation time of the CSI for the aperiodic CSI reporting).

Z' may be represented by a quantity of symbols required by a terminal from a last symbol of a CSI-RS or CSI-IM whose time-domain starting position is later and which is used to measure the CSI to the PUSCH reporting.

Manner 5: When the network side is notified, by using a terminal reporting capability, of a value of a slot offset that can be supported by the terminal device, the slot offset of the CSI reference resource relative to the reporting moment is determined based on one of the following processing manners:

when CSI reporting is periodic reporting or quasi-periodic reporting, obtaining, by using a subcarrier spacing during PUCCH or PUSCH reporting, the slot offset of the CSI reference resource relative to the reporting moment;

when CSI reporting is periodic reporting or quasi-periodic reporting, obtaining, by using a subcarrier spacing of a downlink measurement resource corresponding to the CSI reporting configuration information, the slot offset of the CSI reference resource relative to the reporting moment; and when CSI reporting is periodic reporting or quasi-periodic reporting, obtaining, based on a smallest subcarrier spacing of resource configuration during PUCCH or PUSCH reporting and resource configuration during downlink measurement corresponding to the CSI reporting configuration information, the slot offset of the CSI reference resource relative to the reporting moment.

Specifically, a base station may be notified, by using a terminal reporting capability, of a value of nCQI_ref that can be supported by a user. A terminal obtains the value of nCQI_ref through table lookup according to any one of the foregoing Manner 1, Manner 2, and Manner 3.

Likewise, a processing manner for table lookup in this manner may also be replaced. Specific replacement processing is the same as that in Manner 1, and details are not described herein again.

Based on the descriptions of the foregoing solutions, for the determining a location of the CSI reference resource on a time domain based on at least the slot offset in step 102, that is, determining, by a terminal, the location of the CSI reference resource on the time domain according to a slot n (first uplink slot) and nCQI_ref at PUCCH reporting moment or PUSCH reporting moment, a plurality of processing scenarios in the following may also be included.

Scenario 1: The slot offset is subtracted from the first uplink slot at the PUCCH reporting moment or PUSCH reporting moment to obtain a second uplink slot, and use a first downlink slot corresponding to the second uplink slot as the location of the CSI reference resource on the time domain.

Specifically, when the slot offset is obtained by performing processing in the foregoing Manner 1, a slot at which nCQI_ref before the slot n (first uplink slot) is located, that is, n-nCQI_ref, is first obtained, and then a downlink slot corresponding to the uplink slot is obtained.

Further, an earliest first downlink slot is selected as the location of the CSI reference resource on the time domain when there are at least two first downlink slots corresponding to the first uplink slot. In other words, an earliest slot is selected as the time domain location of the CSI reference resource when there are a plurality of first downlink slots corresponding to the uplink slot.

Alternatively, an earliest valid first downlink slot is selected as the location of the CSI reference resource on the time domain when there are at least two first downlink slots corresponding to the first uplink slot. In other words, an earliest valid downlink slot is selected as the time domain location of the CSI reference resource when there are a plurality of such first downlink slots corresponding to the uplink slot.

Alternatively, a latest first downlink slot is selected as the location of the CSI reference resource on the time domain when there are at least two first downlink slots corresponding to the first uplink slot.

In other words, a latest slot is selected as the time domain location of the CSI reference resource when there are a plurality of such first downlink slots corresponding to the first uplink slot.

Alternatively, a latest valid first downlink slot is selected as the location of the CSI reference resource on the time domain when there are at least two first downlink slots corresponding to the first uplink slot.

In other words, a latest valid downlink slot is selected as the time domain location of the CSI reference resource when there are a plurality of such first downlink slots corresponding to the first uplink slot.

Alternatively, the location of the CSI reference resource on the time domain is determined based on the first uplink slot and the slot offset when there are at least two first downlink slots corresponding to the first uplink slot.

In other words, when there are a plurality of such first downlink slots corresponding to the first uplink slot, a calculation formula, the first uplink slot, and the slot offset may be preset, to calculate and obtain the location of the CSI reference resource on the time domain.

Alternatively, when there are at least two first downlink slots corresponding to the first uplink slot, a corresponding downlink slot is selected as a location of a CSI reference resource of at least two bandwidth parts BWP on the time domain based on at least one of the following manners:

selecting an earliest first downlink slot as the location of the CSI reference resource on the time domain;

selecting an earliest valid first downlink slot as the location of the CSI reference resource on the time domain;

selecting a latest first downlink slot as the location of the CSI reference resource on the time domain; and selecting a latest valid first downlink slot as the location of the CSI reference resource on the time domain.

In other words, when there are a plurality of downlink slots corresponding to the uplink slot, a corresponding downlink slot is selected as the time domain location of the CSI reference resource respectively according to the four manners described above. It should be noted that at least one of the four manners described above may be used.

Scenario 2: A second downlink slot corresponding to a first uplink slot at PUCCH reporting moment or PUSCH reporting moment is determined; and the slot offset is subtracted from the second downlink slot, where an obtained third downlink slot is the location of the CSI reference resource on the time domain In other words, when the slot offset is obtained in the foregoing Manner 2, a downlink slot n' (second downlink slot) corresponding to the slot n (first uplink slot) is first obtained, and a slot at which nCQI_ref before the downlink slot n' (second downlink slot) is located, that is, n'-nCQI_ref, is selected as the time domain location of the CSI reference resource.

Further, a foremost second downlink slot is selected for calculating the third downlink slot when there are at least two second downlink slots corresponding to the first uplink slot.

In other words, a foremost downlink slot n' is selected for calculating the CSI reference resource when there are a plurality of downlink slots n' (second downlink slots) corresponding to the uplink slot n (first uplink slot).

Alternatively, a last second downlink slot is selected for calculating the third downlink slot when there are at least two second downlink slots corresponding to the first uplink slot.

In other words, a last downlink slot n' is selected for calculating the third downlink slot, to determine the CSI reference resource, when there are a plurality of downlink slots n' (second downlink slots) corresponding to the uplink slot n (first uplink slot).

Alternatively, the location of the CSI reference resource on the time domain is determined based on the first uplink slot and the slot offset when there are at least two second downlink slots corresponding to the first uplink slot. In other words, a preset calculation formula may be used to perform calculation when there are a plurality of second downlink slots corresponding to the first uplink slot.

Scenario 3: A subcarrier spacing corresponding to the slot offset is determined to be a downlink subcarrier spacing or an uplink subcarrier spacing, and if the subcarrier spacing is a downlink subcarrier spacing, the location of the CSI reference resource on the time domain is calculated based on one of the following manners:

determining the location of the CSI reference resource on the time domain based on the first uplink slot and the slot offset;

selecting an earliest first downlink slot as the location of the CSI reference resource on the time domain;

selecting an earliest valid first downlink slot as the location of the CSI reference resource on the time domain;

selecting a latest first downlink slot as the location of the CSI reference resource on the time domain; and selecting a latest valid first downlink slot as the location of the CSI reference resource on the time domain.

In other words, when the slot offset is obtained through calculation based on the foregoing Manner 3, a subcarrier spacing corresponding to nCQI_ref is first determined to be a downlink subcarrier spacing or an uplink subcarrier spacing, and if the subcarrier spacing is a downlink subcarrier spacing, the time domain location of the CSI reference resource is calculated according to at least one of the several methods described above.

In addition, the subcarrier spacing corresponding to the slot offset is determined to be a downlink subcarrier spacing or an uplink subcarrier spacing, and if the subcarrier spacing is an uplink subcarrier spacing, an earliest first downlink slot is selected as the location of the CSI reference resource on the time domain. In other words, if the subcarrier spacing corresponding to the slot offset is an uplink subcarrier spacing, the time domain location of the CSI reference resource is calculated according to the method in which the earliest first downlink slot is selected as the location of the CSI reference resource on the time domain.

Finally, after step 102 is completed, CSI is calculated according to a determined time domain location of the CSI reference resource, and reporting is performed by using a PUCCH or PUSCH resource.

It can be learned that in the solution described above, a value of a slot offset of a CSI reference resource relative to a reporting moment can be obtained by using downlink measurement resource configuration and uplink reporting resource configuration that are included in CSI reporting configuration information, and further, a location of the CSI reference resource on a time domain is determined based on the slot offset. In this way, accuracy of calculation for CSI is ensured, and system processing efficiency is improved.

Embodiment 2

This embodiment of the present invention provides a method for determining a resource location, where the method is applied to a network device and includes: sending at least one piece of first information to a terminal device, where the first information carries at least CSI reporting configuration information, and the CSI reporting configuration information includes at least downlink measurement resource configuration and uplink reporting resource configuration.

Specifically, the CSI reporting configuration information further includes: CSI reporting being at least one of the following: periodic reporting, quasi-periodic reporting, and aperiodic reporting.

The downlink measurement resource configuration included in the CSI reporting configuration information includes: configuration of a measurement resource corresponding to CSI reporting.

The uplink reporting resource configuration included in the CSI reporting configuration information includes: PUCCH resource configuration during reporting and/or PUSCH resource configuration during reporting.

It should be noted that the PUCCH resource configuration may be a subcarrier spacing when reporting is performed by using a PUCCH; and the PUSCH resource configuration may be a subcarrier spacing when reporting is performed by using a PUSCH. Certainly, the PUCCH or PUSCH resource configuration may further include other parameters, but the parameters are not further exhaustively listed in this embodiment.

Correspondingly, on a terminal device side, a slot offset may be determined based on the downlink measurement resource configuration and the uplink reporting resource configuration that are included in the CSI reporting configuration information, and further, a location of a CSI reference resource on a time domain is determined based on at least the slot offset. That is, a terminal determines the location of the CSI reference resource on the time domain according to a slot n (first uplink slot) and nCQI_ref at PUCCH reporting moment or PUSCH reporting moment, calculates CSI according to a determined time domain location of the CSI reference resource, and performs reporting by using a PUCCH or PUSCH resource.

It can be learned that in the solution described above, the terminal device can be enabled to obtain a value of a slot offset of a CSI reference resource relative to a reporting moment by using downlink measurement resource configuration and uplink reporting resource configuration that are included in CSI reporting configuration information, and further determine a location of the CSI reference resource on a time domain based on the slot offset. In this way, accuracy of calculation for CSI is ensured, and system processing efficiency is improved.

Embodiment 3

Based on the foregoing embodiments, this embodiment further provides descriptions of a specific processing scenario with reference to Table 1. When there are different numerologies, and CSI reporting includes/does not include CRI, a slot is used as a unit of a value of nCQI_ref (slot offset).

When an uplink subcarrier spacing is 15 KHz, and a downlink subcarrier spacing is 60 KHz, the value of nCQI_ref (slot offset) may be determined based on Manner 1 in Embodiment 1. That is, the value of nCQI_ref (slot offset) is determined to be 4 or 5 based on the uplink subcarrier spacing of 15 KHz.

TABLE 1

| nCQI_ref (Slots) | 15 KHz | 30 KHZ | 60 KHZ | 120 KHz |
|---|---|---|---|---|
| No CRI | 4 | 8 | 16 | 32 |
| CRI | 5 | 10 | 20 | 40 |

Embodiment 4

Based on the foregoing embodiments, this embodiment further provides descriptions of a specific processing scenario with reference to Table 2. When CSI reporting includes/does not include CRI, ms is used as a unit of a value of nCQI_ref (slot offset).

When CSI reporting does not include CRI, an uplink subcarrier spacing is 15 KHz, and a downlink subcarrier spacing is 60 KHz, in this case, the value of nCQI_ref (slot offset) may be determined based on Manner 1 in Embodiment 1. A slot offset that does not include CRI is first obtained to be 4 ms, then according to 1 ms including 4 slots, nCQI_ref is obtained to be 4 slots, where 1 ms including 4 slots is obtained based on the uplink subcarrier spacing.

TABLE 2

| | nCQI_ref (ms) |
|---|---|
| No CRI | 4 |
| CRI | 5 |

Embodiment 5

Based on the foregoing embodiments, this embodiment further provides descriptions of a specific processing scenario with reference to Table 3. When CSI reporting includes/does not include CRI, ms is used as a unit of a value of nCQI_ref (slot offset).

When CSI reporting does not include CRI, an uplink subcarrier spacing is 30 KHz, and a downlink subcarrier spacing is 60 KHz, in this case, the value of nCQI_ref (slot offset) may be determined based on Manner 1 in Embodiment 1. A slot offset that does not include CRI is first obtained to be 4 ms, then according to 1 ms including 4 slots, nCQI_ref is obtained to be 16 slots, where 1 ms including 4 slots is obtained based on the downlink subcarrier spacing.

TABLE 3

| | nCQI_ref (ms) |
|---|---|
| No CRI | 4 |
| CRI | 5 |

Embodiment 6

Description is performed with reference to Table 4. An uplink subcarrier spacing is 15 KHz, a downlink subcarrier spacing is 60 KHz, and it is assumed that a slot of CSI for uplink reporting is a slot 5.

nCQI_ref (slot offset) is obtained based on the uplink subcarrier spacing, and a value thereof is set to 4. In the case, according to Scenario 1 in the foregoing embodiment, 4 is subtracted from 5 to obtain 1, and 1, used as a corresponding second uplink slot, is an uplink slot 1.

In Table 4, first downlink slots corresponding to the uplink slot 1 are slots 1, 2, 3, and 4. In this case, according to the principle that an earliest first downlink slot is selected as a location of a CSI reference resource on a time domain when there are at least two first downlink slots corresponding to the first uplink slot, the slot 1 is selected as a slot at which a downlink CSI reference resource is located.

TABLE 4

| | Slot | | | | | | | | | | | | | | | | | | | |
|---|---|---|---|---|---|---|---|---|---|---|---|---|---|---|---|---|---|---|---|---|
| Downlink 60 KHz | 1 | 2 | 3 | 4 | 5 | 6 | 7 | 8 | 9 | 10 | 11 | 12 | 13 | 14 | 15 | 16 | 17 | 18 | 19 | 20 |
| Uplink 15 KHz | 1 | | | | 2 | | | | 3 | | | | 4 | | | | 5 | | | |

It should be noted that in this embodiment, although processing is performed by using an earliest first downlink slot as the location of the CSI reference resource on the time domain as a principle, in actual processing, a processing principle in which an earliest valid first downlink slot, a latest first downlink slot, or a latest valid first downlink slot is selected as the location of the CSI reference resource on the time domain may alternatively be used.

For example, with reference to the foregoing table, a latest first downlink slot is selected, then a slot 4 may be selected. In addition, assuming that the slot 1 is invalid, the slot 2 is valid, the slot 3 is valid, and the slot 4 is invalid, if an earliest valid first downlink slot is selected, a slot that is finally selected may be the slot 2; and if a latest valid first downlink slot is selected, a slot that is finally selected may be the slot 3.

Embodiment 7

Description is performed with reference to Table 5. It is assumed that an uplink subcarrier spacing is 15 KHz, a downlink subcarrier spacing is 60 KHz, and a slot of CSI for uplink reporting is a slot 5.

nCQI_ref (slot offset) is obtained based on the uplink subcarrier spacing. In this case, a slot at which a CSI reference resource is located may also be obtained according to the following calculation manner $$\left\lfloor (n - n_{CQI\_ref}) \cdot \frac{2^{\mu_1}}{2^{\mu_2}} \right\rfloor,$$

where $\mu_1$ may be a $\mu$ value corresponding to a subcarrier spacing of a measurement resource or another resource related to downlink measurement, and $\mu_2$ may be a $\mu$ value corresponding to a subcarrier spacing of a reported PUCCH or PUSCH resource. It should be further noted that the calculation formula may be rounding up or may be rounding down.

In this case, the slot at which a CSI reference resource is located may be calculated to be 4.

TABLE 5

| | Slot | | | | | | | | | | | | | | | | | | | |
|---|---|---|---|---|---|---|---|---|---|---|---|---|---|---|---|---|---|---|---|---|
| Downlink 60 KHz | 1 | 2 | 3 | 4 | 5 | 6 | 7 | 8 | 9 | 10 | 11 | 12 | 13 | 14 | 15 | 16 | 17 | 18 | 19 | 20 |
| Uplink 15 KHz | | 1 | | | 2 | | | 3 | | | | 4 | | | | 5 | | | | |

Embodiment 8

Referring to Table 6, it is assumed that a downlink subcarrier spacing is 15 KHz, an uplink subcarrier spacing is 60 KHz, and a slot of CSI for uplink reporting is a slot 18.

nCQI_ref (slot offset) is obtained based on the subcarrier spacing of a downlink measurement resource, and a value thereof is set to 4. In this case, a slot at which a CSI reference resource is located may also be obtained according to the following calculation manner $$\left\lfloor n \cdot \frac{2^{\mu_1}}{2^{\mu_2}} \right\rfloor - n_{CQI\_ref},$$

where $\mu_1$ is a $\mu$ value corresponding to a subcarrier spacing of a measurement resource or another resource related to downlink measurement, and $\mu_2$ is a $\mu$ value corresponding to a subcarrier spacing of a reported PUCCH or PUSCH resource. It should be noted that the foregoing formula may be rounding up, or may be rounding down.

In this case, the slot at which a CSI reference resource is located may be calculated to be 0 (1 during rounding up).

TABLE 6

| | Slot | | | | | | | | | | | | | | | | | | | |
|---|---|---|---|---|---|---|---|---|---|---|---|---|---|---|---|---|---|---|---|---|
| Uplink 60 KHz | 1 | 2 | 3 | 4 | 5 | 6 | 7 | 8 | 9 | 10 | 11 | 12 | 13 | 14 | 15 | 16 | 17 | 18 | 19 | 20 |
| Downlink 15 KHz | | 1 | | | 2 | | | 3 | | | | 4 | | | | 5 | | | | |

Embodiment 9

Referring to Table 7, an uplink subcarrier spacing is 15 KHz, a downlink subcarrier spacing is 60 KHz, and it is assumed that a slot of CSI for uplink reporting is a slot 5.

nCQI_ref (slot offset) is obtained based on the subcarrier spacing of a downlink measurement resource, and a value thereof is set to 16. In this case, a slot at which a CSI reference resource is located may be obtained according to the following calculation manner $$\left\lfloor n \cdot \frac{2^{\mu_1}}{2^{\mu_2}} \right\rfloor - n_{CQI\_ref},$$

where $\mu_1$ is a $\mu$ value corresponding to a subcarrier spacing of a measurement resource or another resource related to downlink measurement, and $\mu_2$ is a $\mu$ value corresponding to a subcarrier spacing of a reported PUCCH or PUSCH resource. Likewise, the foregoing formula may be rounding up, or may be rounding down.

In this case, the slot at which a CSI reference resource is located may be calculated to be 4 (also 4 during rounding up).

TABLE 7

| | Slot | | | | | | | | | | | | | | | | | | | |
|---|---|---|---|---|---|---|---|---|---|---|---|---|---|---|---|---|---|---|---|---|
| Downlink 60 KHz | 1 | 2 | 3 | 4 | 5 | 6 | 7 | 8 | 9 | 10 | 11 | 12 | 13 | 14 | 15 | 16 | 17 | 18 | 19 | 20 |
| Uplink 15 KHz | | 1 | | | 2 | | | 3 | | | | 4 | | | | 5 | | | | |

Embodiment 10

Figure 2:
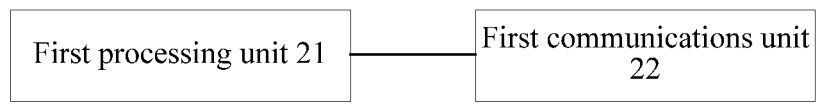
FIG. 2 is a schematic structural composition diagram of a terminal device according to an embodiment of the present invention.

This embodiment of the present invention provides a terminal device in a communication system, as shown in FIG. 2, including:

a first processing unit 21, configured to determine a slot offset based on downlink measurement resource configuration and uplink reporting resource configuration that are included in CSI reporting configuration information, where the slot offset represents a slot offset of a CSI reference resource relative to a reporting moment; and determine a location of the CSI reference resource on a time domain based on at least the slot offset.

The terminal device further includes:

a first communications unit 22, configured to receive first information sent by a network side.

Correspondingly, the first processing unit 21 is configured to obtain at least one piece of CSI reporting configuration information based on the first information.

Specifically, the CSI reporting configuration information further includes: CSI reporting being at least one of the following: periodic reporting, quasi-periodic reporting, and aperiodic reporting.

The downlink measurement resource configuration included in the CSI reporting configuration information includes: configuration of a measurement resource corresponding to CSI reporting.

The uplink reporting resource configuration included in the CSI reporting configuration information includes: PUCCH resource configuration during reporting and/or PUSCH resource configuration during reporting.

It should be noted that the PUCCH resource configuration may be a subcarrier spacing when reporting is performed by using a PUCCH; and the PUSCH resource configuration may be a subcarrier spacing when reporting is performed by using a PUSCH. Certainly, the PUCCH or PUSCH resource configuration may further include other parameters, but the parameters are not further exhaustively listed in this embodiment.

The determining a slot offset based on downlink measurement resource configuration and uplink reporting resource configuration that are included in CSI reporting configuration information may include the following several specific processing manners:

Manner 1: The first processing unit 21 is configured to: when CSI reporting is periodic reporting or quasi-periodic reporting, determine, based on resource configuration during PUCCH or PUSCH reporting, the slot offset of the CSI reference resource relative to the reporting moment.

Specifically, during periodic reporting or quasi-periodic reporting, a value of nCQI_ref (the slot offset of the CSI reference resource relative to the reporting moment) is obtained through table lookup by using a subcarrier spacing in the resource configuration during PUCCH or PUSCH reporting.

A table corresponding to the table lookup operation may be a first table corresponding to a preset subcarrier spacing and a preset slot offset.

It should be noted that, for the manner of determining, based on resource configuration during PUCCH or PUSCH reporting, the slot offset of the CSI reference resource relative to the reporting moment, apart from the table lookup described above, there may further be other processing methods. For example, the slot offset may be determined by using a preset correspondence. For example, it is preset that a subcarrier spacing 1 corresponding to the PUCCH or the PUSCH corresponds to a slot offset 1, and a subcarrier spacing 2 corresponds to a slot offset 2. In addition, calculation may alternatively be performed based on a preset calculation formula. For example, a calculation formula is specified according to a correspondence between a subcarrier spacing and a slot offset, and the slot offset may be obtained by performing calculation on different subcarrier spacings and corresponding parameters, where the specified calculation formula may be specified according to an actual case.

Manner 2: The first processing unit 21 is configured to: when CSI reporting is periodic reporting or quasi-periodic reporting, determine, based on resource configuration of a downlink measurement resource corresponding to the CSI reporting configuration information, the slot offset of the CSI reference resource relative to the reporting moment.

Specifically, during periodic reporting or quasi-periodic reporting, a value of nCQI_ref is obtained through table lookup by using a subcarrier spacing of the downlink measurement resource corresponding to the CSI reporting.

In other words, in this manner, the resource configuration of the downlink measurement resource may further include: the subcarrier spacing.

Likewise, a processing manner for table lookup in this manner may also be replaced. Specific replacement processing is the same as that in Manner 1, and details are not described herein again.

Manner 3: The first processing unit 21 is configured to: when CSI reporting is periodic reporting or quasi-periodic reporting, determine, based on resource configuration during PUCCH or PUSCH reporting and resource configuration during downlink measurement corresponding to the CSI reporting configuration information, the slot offset of the CSI reference resource relative to the reporting moment.

Specifically, when CSI reporting is periodic reporting or quasi-periodic reporting, the slot offset of the CSI reference resource relative to the reporting moment is obtained based on a smallest or largest subcarrier spacing in the resource configuration during PUCCH or PUSCH reporting and resource configuration during downlink measurement corresponding to the CSI reporting configuration information.

For example, a value of nCQI_ref may be obtained through table lookup by using the smallest or largest subcarrier spacing of the downlink measurement resource corresponding to the CSI reporting during PUCCH or PUSCH reporting. Likewise, a processing manner for table lookup in this manner may also be replaced. Specific replacement processing is the same as that in Manner 1, and details are not described herein again.

Manner 4: The first processing unit 21 is configured to: when CSI reporting is aperiodic reporting, obtain, according to a CSI calculation time, the slot offset of the CSI reference resource relative to the reporting moment.

For example, if reporting is performed by using a PUSCH (or a PUCCH), when aperiodic CSI is reported by using the PUSCH, a value of nCQI_ref is obtained by using Z' (that is, a calculation time of the CSI for the aperiodic CSI reporting).

Z' may be represented by a quantity of symbols required by a terminal from a last symbol of a CSI-RS or CSI-IM whose time-domain starting position is later and which is used to measure the CSI to the PUSCH reporting.

Manner 5: The first processing unit 21 is configured to: when the network side is notified, by using a terminal reporting capability, of a value of a slot offset that can be supported by the terminal device, determine the slot offset of the CSI reference resource relative to the reporting moment based on one of the following processing manners:

when CSI reporting is periodic reporting or quasi-periodic reporting, obtaining, by using a subcarrier spacing during PUCCH or PUSCH reporting, the slot offset of the CSI reference resource relative to the reporting moment;

when CSI reporting is periodic reporting or quasi-periodic reporting, obtaining, by using a subcarrier spacing of a downlink measurement resource corresponding to the CSI reporting configuration information, the slot offset of the CSI reference resource relative to the reporting moment; and when CSI reporting is periodic reporting or quasi-periodic reporting, obtaining, based on a smallest subcarrier spacing of resource configuration during PUCCH or PUSCH reporting and resource configuration during downlink measurement corresponding to the CSI reporting configuration information, the slot offset of the CSI reference resource relative to the reporting moment.

Specifically, a base station may be notified, by using a terminal reporting capability, of a value of nCQI_ref that can be supported by a user. A terminal obtains the value of nCQI_ref through table lookup according to any one of the foregoing Manner 1, Manner 2, and Manner 3.

Likewise, a processing manner for table lookup in this manner may also be replaced. Specific replacement processing is the same as that in Manner 1, and details are not described herein again.

Based on the descriptions of the foregoing solutions, for the determining a location of the CSI reference resource on a time domain based on at least the slot offset, that is, determining, by a terminal, the location of the CSI reference resource on the time domain according to a slot n (first uplink slot) and nCQI_ref at PUCCH reporting moment or PUSCH reporting moment, a plurality of processing scenarios in the following may also be included.

Scenario 1: The first processing unit 21 is configured to: subtract the slot offset from the first uplink slot at the PUCCH reporting moment or PUSCH reporting moment to obtain a second uplink slot, and use a first downlink slot corresponding to the second uplink slot as the location of the CSI reference resource on the time domain.

Specifically, when the slot offset is obtained by performing processing in the foregoing Manner 1, a slot at which nCQI_ref before the slot n (first uplink slot) is located, that is, n-nCQI_ref, is first obtained, and then a downlink slot corresponding to the uplink slot is obtained.

Further, an earliest first downlink slot is selected as the location of the CSI reference resource on the time domain when there are at least two first downlink slots corresponding to the first uplink slot. In other words, an earliest slot is selected as the time domain location of the CSI reference resource when there are a plurality of first downlink slots corresponding to the uplink slot.

Alternatively, an earliest valid first downlink slot is selected as the location of the CSI reference resource on the time domain when there are at least two first downlink slots corresponding to the first uplink slot. In other words, an earliest valid downlink slot is selected as the time domain location of the CSI reference resource when there are a plurality of such first downlink slots corresponding to the uplink slot.

Alternatively, a latest first downlink slot is selected as the location of the CSI reference resource on the time domain when there are at least two first downlink slots corresponding to the first uplink slot.

In other words, a latest slot is selected as the time domain location of the CSI reference resource when there are a plurality of such first downlink slots corresponding to the first uplink slot.

Alternatively, a latest valid first downlink slot is selected as the location of the CSI reference resource on the time domain when there are at least two first downlink slots corresponding to the first uplink slot.

In other words, a latest valid downlink slot is selected as the time domain location of the CSI reference resource when there are a plurality of such first downlink slots corresponding to the first uplink slot.

Alternatively, the location of the CSI reference resource on the time domain is determined based on the first uplink slot and the slot offset when there are at least two first downlink slots corresponding to the first uplink slot.

In other words, when there are a plurality of such first downlink slots corresponding to the first uplink slot, a calculation formula, the first uplink slot, and the slot offset may be preset, to calculate and obtain the location of the CSI reference resource on the time domain.

Alternatively, when there are at least two first downlink slots corresponding to the first uplink slot, a corresponding downlink slot is selected as a location of a CSI reference resource of at least two bandwidth parts BWP on the time domain based on at least one of the following manners:

selecting an earliest first downlink slot as the location of the CSI reference resource on the time domain;

selecting an earliest valid first downlink slot as the location of the CSI reference resource on the time domain;

selecting a latest first downlink slot as the location of the CSI reference resource on the time domain; and selecting a latest valid first downlink slot as the location of the CSI reference resource on the time domain.

In other words, when there are a plurality of downlink slots corresponding to the uplink slot, a corresponding downlink slot is selected as the time domain location of the CSI reference resource respectively according to the four manners described above. It should be noted that at least one of the four manners described above may be used.

Scenario 2: The first processing unit 21 is configured to: determine a second downlink slot corresponding to a first uplink slot at PUCCH reporting moment or PUSCH reporting moment; and subtract the slot offset from the second downlink slot, and use an obtained third downlink slot as the location of the CSI reference resource on the time domain.

In other words, when the slot offset is obtained in the foregoing Manner 2, a downlink slot n' (second downlink slot) corresponding to the slot n (first uplink slot) is first obtained, and a slot at which nCQI_ref before the downlink slot n' (second downlink slot) is located, that is, n'-nCQI_ref, is selected as the time domain location of the CSI reference resource.

Further, a foremost second downlink slot is selected for calculating the third downlink slot when there are at least two second downlink slots corresponding to the first uplink slot.

In other words, a foremost downlink slot n' is selected for calculating the CSI reference resource when there are a plurality of downlink slots n' (second downlink slots) corresponding to the uplink slot n (first uplink slot).

Alternatively, a last second downlink slot is selected for calculating the third downlink slot when there are at least two second downlink slots corresponding to the first uplink slot.

In other words, a last downlink slot n' is selected for calculating the third downlink slot, to determine the CSI reference resource, when there are a plurality of downlink slots n' (second downlink slots) corresponding to the uplink slot n (first uplink slot).

Alternatively, the location of the CSI reference resource on the time domain is determined based on the first uplink slot and the slot offset when there are at least two second downlink slots corresponding to the first uplink slot. In other words, a preset calculation formula may be used to perform calculation when there are a plurality of second downlink slots corresponding to the first uplink slot.

Scenario 3: The first processing unit 21 is configured to: determine a subcarrier spacing corresponding to the slot offset to be a downlink subcarrier spacing or an uplink subcarrier spacing, and if the subcarrier spacing is a downlink subcarrier spacing, calculate the location of the CSI reference resource on the time domain based on one of the following manners:

determining the location of the CSI reference resource on the time domain based on the first uplink slot and the slot offset;

selecting an earliest first downlink slot as the location of the CSI reference resource on the time domain;

selecting an earliest valid first downlink slot as the location of the CSI reference resource on the time domain;

selecting a latest first downlink slot as the location of the CSI reference resource on the time domain; and selecting a latest valid first downlink slot as the location of the CSI reference resource on the time domain.

In other words, when the slot offset is obtained through calculation based on the foregoing Manner 3, a subcarrier spacing corresponding to nCQI_ref is first determined to be a downlink subcarrier spacing or an uplink subcarrier spacing, and if the subcarrier spacing is a downlink subcarrier spacing, the time domain location of the CSI reference resource is calculated according to at least one of the several methods described above.

In addition, the first processing unit 21 is configured to: determine a subcarrier spacing corresponding to the slot offset to be a downlink subcarrier spacing or an uplink subcarrier spacing, and if the subcarrier spacing is an uplink subcarrier spacing, select an earliest first downlink slot as the location of the CSI reference resource on the time domain. In other words, if the subcarrier spacing corresponding to the slot offset is an uplink subcarrier spacing, the time domain location of the CSI reference resource is calculated according to the method in which the earliest first downlink slot is selected as the location of the CSI reference resource on the time domain.

Finally, the first processing unit 21 is configured to: calculate CSI according to a determined time domain location of the CSI reference resource, and perform reporting by using a PUCCH or PUSCH resource.

It can be learned that in the solution described above, a value of a slot offset of a CSI reference resource relative to a reporting moment can be obtained by using downlink measurement resource configuration and uplink reporting resource configuration that are included in CSI reporting configuration information, and further, a location of the CSI reference resource on a time domain is determined based on the slot offset. In this way, accuracy of calculation for CSI is ensured, and system processing efficiency is improved.

Embodiment 11

This embodiment of the present invention provides a network device, including: a second communications unit, configured to send at least one piece of first information to a terminal device, where the first information carries at least CSI reporting configuration information, and the CSI reporting configuration information includes at least downlink measurement resource configuration and uplink reporting resource configuration.

Specifically, the CSI reporting configuration information further includes: CSI reporting being at least one of the following: periodic reporting, quasi-periodic reporting, and aperiodic reporting.

The downlink measurement resource configuration included in the CSI reporting configuration information includes: configuration of a measurement resource corresponding to CSI reporting.

The uplink reporting resource configuration included in the CSI reporting configuration information includes: PUCCH resource configuration during reporting and/or PUSCH resource configuration during reporting.

It should be noted that the PUCCH resource configuration may be a subcarrier spacing when reporting is performed by using a PUCCH; and the PUSCH resource configuration may be a subcarrier spacing when reporting is performed by using a PUSCH. Certainly, the PUCCH or PUSCH resource configuration may further include other parameters, but the parameters are not further exhaustively listed in this embodiment.

Correspondingly, on a terminal device side, a slot offset may be determined based on the downlink measurement resource configuration and the uplink reporting resource configuration that are included in the CSI reporting configuration information, and further, a location of a CSI reference resource on a time domain is determined based on at least the slot offset. That is, a terminal determines the location of the CSI reference resource on the time domain according to a slot n (first uplink slot) and nCQI_ref at PUCCH reporting moment or PUSCH reporting moment, calculates CSI according to a determined time domain location of the CSI reference resource, and performs reporting by using a PUCCH or PUSCH resource.

It can be learned that in the solution described above, the terminal device can be enabled to obtain a value of a slot offset of a CSI reference resource relative to a reporting moment by using downlink measurement resource configuration and uplink reporting resource configuration that are included in CSI reporting configuration information, and further determine a location of the CSI reference resource on a time domain based on the slot offset. In this way, accuracy of calculation for CSI is ensured, and system processing efficiency is improved.

Figure 3:
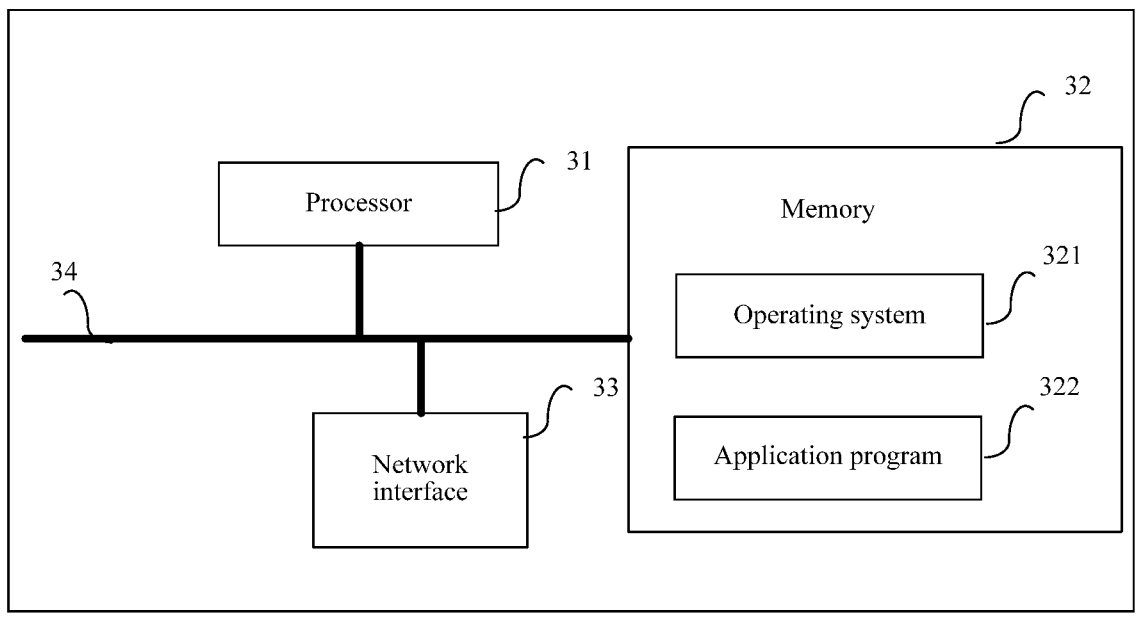
FIG. 3 is a schematic diagram of a hardware architecture according to an embodiment of the present invention.

An embodiment of the present invention further provides a hardware composition architecture of a terminal device or a network device. As shown in FIG. 3, the architecture includes: at least one processor 31, a memory 32, and at least one network interface 33. All the components are coupled together by using a bus system 34. It may be understood that, the bus system 34 is configured to implement connection and communication between the components. In addition to a data bus, the bus system 34 further includes a power supply bus, a control bus, and a status signal bus. However, for the purpose of clear description, all buses are marked as the bus system 34 in FIG. 3.

It may be understood that the memory 32 in the embodiments of the present invention may be a volatile memory or a nonvolatile memory, or may include a volatile memory and a nonvolatile memory.

In some implementations, the memory 32 stores the following elements: an executable module or a data structure, or a subset thereof, or an extended set thereof:

an operating system 321 and an application program 322.

The processor 31 is configured to be capable of processing steps of the method in the foregoing Embodiment 1 or 2, and details are not described herein again.

When the apparatuses described above in the embodiments of the present invention are implemented in a form of a software functional module and sold or used as independent products, the apparatuses may be alternatively stored in a computer-readable storage medium. Based on such an understanding, the technical solutions of the embodiments of the present invention essentially, or the part contributing to the prior art may be implemented in a form of a software product. The computer software product is stored in a storage medium and includes several instructions for instructing a computer device (which may be a personal computer, a server, a network device, or the like) to perform all or some of the methods described in the embodiments of the present invention. The foregoing storage medium includes: any medium that can store program code, such as a USB flash drive, a removable hard disk, a read-only memory (ROM), a magnetic disk, or a compact disc. In this way, the embodiments of the present invention are not limited to any specific combination of hardware and software.

An embodiment of the present invention provides a computer storage medium, where the computer storage medium stores a computer-executable instruction, the computer-executable instruction, when being executed, implementing the steps of the method in the foregoing Embodiment 1 or 2.

Although preferred embodiments of the present invention are disclosed for an exemplary objective, a person skilled in the art may be aware of various possible modifications, additions, and replacements. Therefore, the scope of the present invention shall not be limited to the foregoing embodiments.

What is claimed is:

1. A method for determining a resource location, implemented by a terminal device, the method comprising:

determining, based on a first uplink slot where channel state information (CSI) reporting moment is located, a second downlink slot corresponding to the CSI reporting moment;

obtaining a slot offset, wherein the slot offset is a slot offset of a location of a CSI reference resource on a time domain relative to the second downlink slot; and determining a third downlink slot as the location of the CSI reference resource on the time domain, wherein the third downlink slot is obtained by subtracting the slot offset from the second downlink slot, wherein the second downlink slot is determined according to the following formula:

$$n' = \left\lfloor n * \frac{2^{\mu_1}}{2^{\mu_2}} \right\rfloor$$

where n' represents the second downlink slot, n represents the first uplink slot, $\mu_1$ represents subcarrier spacing configuration for downlink, and $\mu_2$ represents subcarrier spacing configuration for uplink.

2. The method of claim 1, wherein obtaining the slot offset comprises:

determining the slot offset based on downlink measurement resource configuration comprised in CSI reporting configuration information.

3. The method of claim 2, wherein determining the slot offset based on the downlink measurement resource configuration comprised in the CSI reporting configuration information comprises:
   determining the slot offset based on a subcarrier spacing corresponding to the downlink measurement resource configuration comprised in the CSI reporting configuration information.

4. The method of claim 2, wherein
   the downlink measurement resource configuration comprised in the CSI reporting configuration information comprises: configuration of a measurement resource corresponding to CSI reporting.

5. The method of claim 2, wherein
   the CSI reporting configuration information further comprises: CSI reporting being periodic reporting, or quasi-periodic reporting.

6. The method of claim 2, wherein the method further comprises:
   receiving first information; and
   acquiring the CSI reporting configuration information based on the first information.

7. A terminal device in a communication system, comprising:
   a processor; and
   a memory storing program instructions,
   wherein
   when the program instructions are executed by the processor, the terminal device is configured to:
      determine, based on a first uplink slot where channel state information (CSI) reporting moment is located, a second downlink slot corresponding to the CSI reporting moment;
      obtain a slot offset, wherein the slot offset is a slot offset of a location of a CSI reference resource on a time domain relative to the second downlink slot; and
      determine a third downlink slot as the location of the CSI reference resource on the time domain, wherein the third downlink slot is obtained by subtracting the slot offset from the second downlink slot,
      wherein the second downlink slot is determined according to the following formula:

$$n' = \left\lfloor n * \frac{2^{\mu_1}}{2^{\mu_2}} \right\rfloor$$

where n' represents the second downlink slot, n represents the first uplink slot, $\mu_1$ represents subcarrier spacing configuration for downlink, and $\mu_2$ represents subcarrier spacing configuration for uplink.

8. The terminal device of claim 7, wherein, when the program instructions are executed by the processor, the terminal device is further configured to:
   determine the slot offset based on downlink measurement resource configuration comprised in CSI reporting configuration information.

9. The terminal device of claim 8, wherein, when the program instructions are executed by the processor, the terminal device is further configured to:
   determine the slot offset based on a subcarrier spacing corresponding to the downlink measurement resource configuration comprised in the CSI reporting configuration information.

10. The terminal device of claim 8, wherein
    the downlink measurement resource configuration comprised in the CSI reporting configuration information comprises: configuration of a measurement resource corresponding to CSI reporting.

11. The terminal device of claim 8, wherein
    the CSI reporting configuration information further comprises: CSI reporting being periodic reporting, or quasi-periodic reporting.

12. The terminal device of claim 8, wherein, when the program instructions are executed by the processor, the terminal device is further configured to:
    receive, through a transceiver, first information; and
    acquire the CSI reporting configuration information based on the first information.

13. A non-transitory computer readable storage medium, storing computer readable instructions, which when executed by a processor, cause the processor to perform operations comprising:
    determining, based on a first uplink slot where channel state information (CSI) reporting moment is located, a second downlink slot corresponding to the CSI reporting moment;
    obtaining a slot offset, wherein the slot offset is a slot offset of a location of a CSI reference resource on a time domain relative to the second downlink slot; and
    determining a third downlink slot as the location of the CSI reference resource on the time domain, wherein the third downlink slot is obtained by subtracting the slot offset from the second downlink slot,
    wherein the second downlink slot is determined according to the following formula:

$$n' = \left\lfloor n * \frac{2^{\mu_1}}{2^{\mu_2}} \right\rfloor$$

where n' represents the second downlink slot, n represents the first uplink slot, $\mu_1$ represents subcarrier spacing configuration for downlink, and $\mu_2$ represents subcarrier spacing configuration for uplink.

14. The non-transitory computer readable storage medium of claim 13, wherein obtaining the slot offset comprises:
    determining the slot offset based on downlink measurement resource configuration comprised in CSI reporting configuration information.

15. The non-transitory computer readable storage medium of claim 14, wherein determining the slot offset based on the downlink measurement resource configuration comprised in the CSI reporting configuration information comprises:
    determining the slot offset based on a subcarrier spacing corresponding to the downlink measurement resource configuration comprised in the CSI reporting configuration information.

16. The non-transitory computer readable storage medium of claim 14, wherein the downlink measurement resource configuration comprised in the CSI reporting configuration information comprises: configuration of a measurement resource corresponding to CSI reporting.

17. The non-transitory computer readable storage medium of claim 14, wherein the CSI reporting configuration information further comprises: CSI reporting being periodic reporting, or quasi-periodic reporting.

* * * * *